(12) United States Patent
Mihara

(10) Patent No.: US 7,301,576 B2
(45) Date of Patent: Nov. 27, 2007

(54) ELECTRONIC IMAGING APPARATUS

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 861 days.

(21) Appl. No.: 10/753,356

(22) Filed: Jan. 9, 2004

(65) Prior Publication Data
US 2004/0141086 A1 Jul. 22, 2004

(30) Foreign Application Priority Data
Jan. 10, 2003 (JP) ............................. 2003-004738

(51) Int. Cl.
*H04N 5/225* (2006.01)
(52) U.S. Cl. ...................... 348/335; 359/680
(58) Field of Classification Search ................ 348/335, 348/360; 359/680–683
See application file for complete search history.

(56) References Cited

U.S. PATENT DOCUMENTS

| 6,104,547 | A * | 8/2000 | Nanba ...................... 359/687 |
| 6,118,516 | A * | 9/2000 | Irie et al. ..................... 355/53 |
| 6,297,912 | B1 * | 10/2001 | Goto .......................... 359/676 |
| 6,545,714 | B1 * | 4/2003 | Takada ....................... 348/340 |
| 6,992,720 | B2 * | 1/2006 | Kaneda ....................... 348/363 |
| 7,095,560 | B2 * | 8/2006 | Toyoda et al. .............. 359/558 |
| 7,116,487 | B2 * | 10/2006 | Miyauchi et al. ........... 359/663 |
| 7,193,651 | B2 * | 3/2007 | Kato .......................... 348/349 |
| 7,215,486 | B2 * | 5/2007 | Mihara ....................... 359/687 |
| 2002/0171750 | A1 * | 11/2002 | Kato .......................... 348/345 |
| 2003/0103157 | A1 * | 6/2003 | Watanabe et al. .......... 348/360 |
| 2004/0085472 | A1 * | 5/2004 | Mihara ....................... 348/335 |

FOREIGN PATENT DOCUMENTS

| JP | 2001-111871 | 4/2001 |
| JP | 2001-111872 | 4/2001 |

* cited by examiner

*Primary Examiner*—Lin Ye
*Assistant Examiner*—Amy Hsu
(74) *Attorney, Agent, or Firm*—Kenyon & Kenyon LLP

(57) ABSTRACT

1. An electronic imaging apparatus comprises an imaging optical system, and an imaging device which converts an object image obtained via the imaging system to an electric signal. All of medium of optical elements which is disposed in a space between a most object side of the imaging system and the imaging device is constituted with optically isotropic medium. A diameter of a point image at the open F value of the imaging system is bigger than a pitch of a picture element. The following condition is satisfied;

$$F > 1.4 \cdot a (0 < a \leq 4)$$

Where F represents the open F value of the imaging optical system, and a represents the pitch at a horizontal or a vertical direction of the imaging device.

11 Claims, 8 Drawing Sheets

Fig.10A
Fig.10B
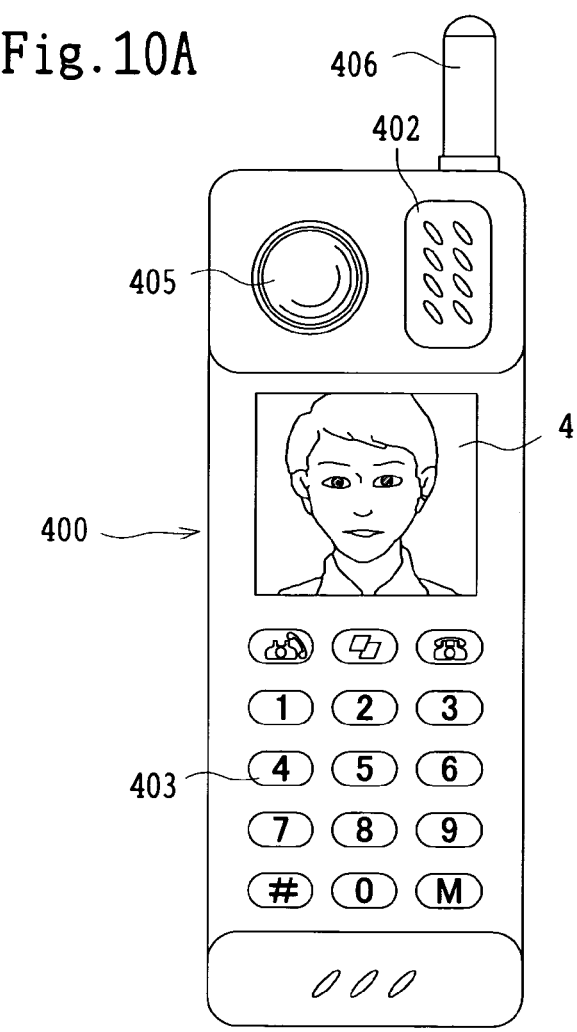
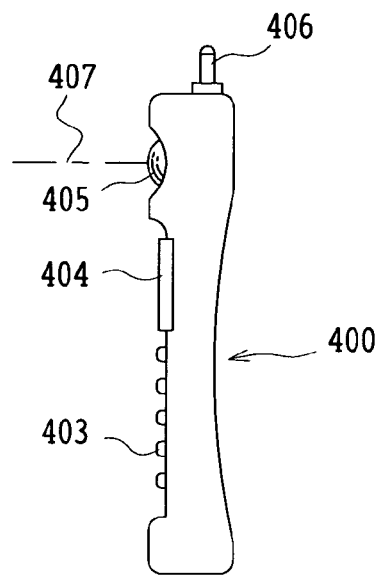
Fig.10C
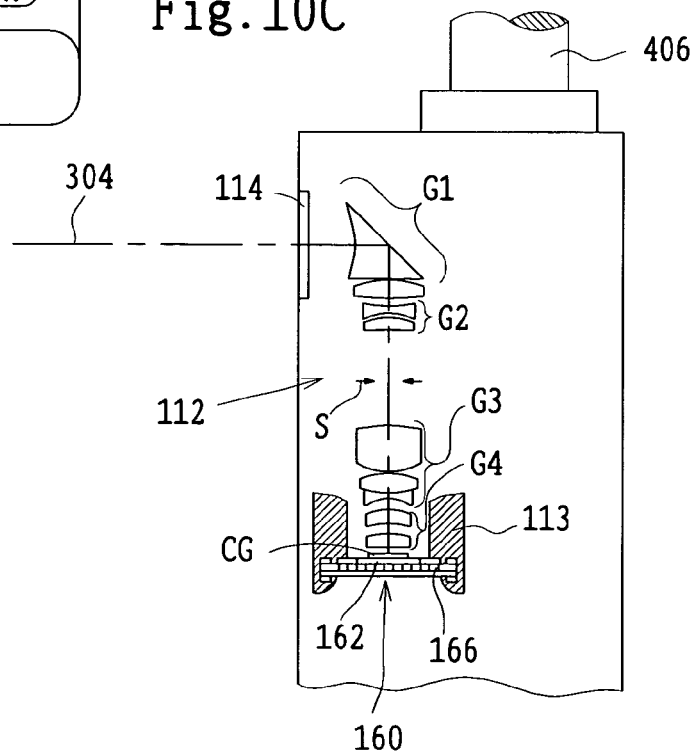

ELECTRONIC IMAGING APPARATUS

BACKGROUND OF THE INVENTION

1. Field of the Invention

This invention relates to an electronic imaging apparatus using an imaging device having very fine pitch of a picture element.

2. Description of the Related Art

In recent electronic imaging apparatus including digital camera, the increase in the number of picture element in a high-class type and the miniaturization of imaging element in a popular type are remarkable. A common point in these two tendencies is that the pitch of the picture element of the imaging element in the both types tends to become much finer. In a conventional electronic imaging apparatus, the apparatus having an optical performance sufficient to the Nyquist frequency decided from the pitch of the picture element of an imaging device as an imaging optical system has been used. However, if the pitch of the picture element is fine, the Nyquist frequency will become high frequency, and the optical performance required for the optical system will also become very high.

In order to cope with such aspects, in the imaging optical system, it is required that the compensation level of geometric aberration is improved and that a manufacture error does not affect performance degradation, etc. Moreover, by a pitch of the picture element becoming smaller, the point spread function by the imaging optical system spreads relatively. And the level of the influence of quality of image degradation by so-called diffraction shade cannot be disregarded.

Moreover, in a conventional electronic imaging apparatus, an optical low-pass filter is inserted in optical path in order to prevent from distortion by light return and to eliminate intentionally contrast having frequency component more than Nyquist frequency. However, an optical low-pass filter is expensive and when it is built in an optical path of an electronic imaging apparatus, the volume or size of apparatus will increase. Moreover, there is a problem of reducing the contrast in low spatial frequency, and degrading imaging performance that an imaging optical system has originally.

For example, an imaging apparatus described in Japanese Patent Preliminary Publication No. 2000-244799 is conventionally proposed as an electronic imaging apparatus by which a high grade picture is obtained using an imaging element having very fine pitch of a picture element, without using an optical low-pass filter

SUMMARY OF THE INVENTION

The electronic imaging apparatus according to the present invention comprises an imaging optical system and an electronic imaging device which converts an object image obtained via the imaging optical system to an electric signal, wherein all medium of optical elements which is disposed in a space between a lens element located at most image side of the imaging optical system and the electronic imaging device and on the optical path are constituted of optically medium (for example, air, non crystal medium, etc.), and the diameter of point image at the open F value is bigger than one pitch of a picture element, and the following condition is satisfied:

$$F > 1.4 \cdot a \quad (0 < a \leq 4)$$

where F represents the open F value of the imaging optical system and a represents a pitch of the picture element at a horizontal or a vertical direction of the electronic imaging device.

Here, the value of a is shown by the unit of μm. Also, a can be replaced by $a \times 10^3$ so as to use the unit of mm. Otherwise, numeral of a pitch of the picture element having the unit of μm can be a as a numeral without having unit name. Or the unit of the numeral 1.4 can be a reciprocal of the unit of a, (for example, the unit is 1/μm if the unit of a is μm or 1/mm if the unit of a is mm) The point image is defined as an image which is formed by a point light source being imaged via an imaging optical system.

In the electronic imaging apparatus according to the present invention, it is desirable that F value of the imaging optical system remains fixed at the open F value.

In the electronic imaging apparatus according to the present invention, it is desirable that the following condition is satisfied:

$$1.0 \times 10^6 < m < 0.08n$$

where n is the effective number of a picture element which contributes substantially to imaging in the electronic imaging device and m is substantial number of the picture element which is recorded on a recording medium in the electronic imaging apparatus (the number of recorded picture element).

In the electronic imaging apparatus according to the present invention, it is desirable that the following condition is satisfied:

$$(Ein/Etot)\max < 0.5$$

where Ein is incident energy of the point image to area corresponding to the size of one picture element and Etot is total energy of the point image and (Ein/Etot)max is the maximum value of ratio (Ein/Etot).

In the electronic imaging apparatus according to the present invention, it is desirable that the difference of the maximum value and the minimum value of the ratio of ymax/Pex is 0.2 or less than 0.2 throughout the whole range of zooming and focussing. Here, ymax (the maximum image height) is the distance from the intersection of an optical axis of the imaging optical system and an image surface of the imaging device to the furthest point in the effective imaging area of the electronic imaging device, and Pex is the distance from the imaging plane of the electronic imaging device to an exit pupil position (it shall become a negative value when it is measured toward an object side).

In the electronic imaging apparatus according to the present invention, it is desirable that an optical element (for example, an electrochromic element) which can change transmittance by controlling quantity or voltage of electricity is arranged in the optical path.

In the electronic imaging apparatus according to the present invention, it is desirable that the ratio of the maximum transmittance τmax ($\geq 0.7$) and the minimum transmittance τmin ($\leq 0.3$) at the wavelength of 520 nm of the optical element which can change transmittance by controlling quantity or voltage of electricity is 2.5 or more.

In the electronic imaging apparatus according to the present invention, it is desirable that with respect to the transmittance τ520 at the wavelength of 520 nm, the spectrum transmittance at the whole range (τmin$\leq$τ520$\leq$τmax) satisfies the following condition:

$$\tau 440/\tau 520 > 0.7$$

$$\tau 600/\tau 520 > 0.8$$

where τX (X is a numeral) is the transmittance at the wavelength X nm.

In the electronic imaging apparatus according to the present invention, it is desirable that with respect to the transmittance τ520 at the wavelength of 520 nm, the spectrum transmittance at the whole range (τmin≦τ520≦τmax) satisfies the following condition:

$$\tau 440/\tau 520 > 0.75$$

$$\tau 600/\tau 520 > 0.85$$

where τX (X is a numeral) is the transmittance at the wavelength X nm.

In the electronic imaging apparatus according to the present invention, it is desirable that with respect to the transmittance τ520 at the wavelength of 520 nm, the spectrum transmittance at the whole range (τmin≦τ520≦τmax) satisfies the following condition:

$$\tau 440/\tau 520 > 0.8$$

$$\tau 600/\tau 520 > 0.9$$

where τX (X is a numeral) is the transmittance at the wavelength X nm.

In the electronic imaging apparatus according to the present invention, it is desirable that the optical element which can change transmittance by controlling quantity or voltage of electricity is constituted so that electrochemistry substance is interposed between solid transparent members from both sides, and at least one of the solid transparent members is constituted of lens.

According to the present invention, in the case that F value of an imaging optical system is the open F value, a component which influences the distortion by return can be eliminated and an optical low-pass filter can be also abolished and high contrast in the spatial frequency below diffraction limit can be maintained by using an imaging device having Nyquist spatial frequency (lines/mm) which is higher than the resolution power (lines/mm) of general imaging optical system. Thus, the present invention is capable to provide small-sized electronic imaging apparatus in which high picture quality can be obtained.

These and other features and advantages of the present invention will become apparent from the following detailed description of the preferred embodiments when take in conjunction with the accompanying drawings.

BRIEF DESCRIPTION OF THE DRAWINGS

FIGS. 10A, 10B, and 10C are a front view and a side view showing a cellular phone, as an example of the information processing equipment, where the zoom lens having bent optical path according to the present invention is built in as a photographing optical system, and a sectional view of the photographing optical system, respectively.

DETAILED DESCRIPTION OF THE PREFERRED EMBODIMENTS

Figure 1:
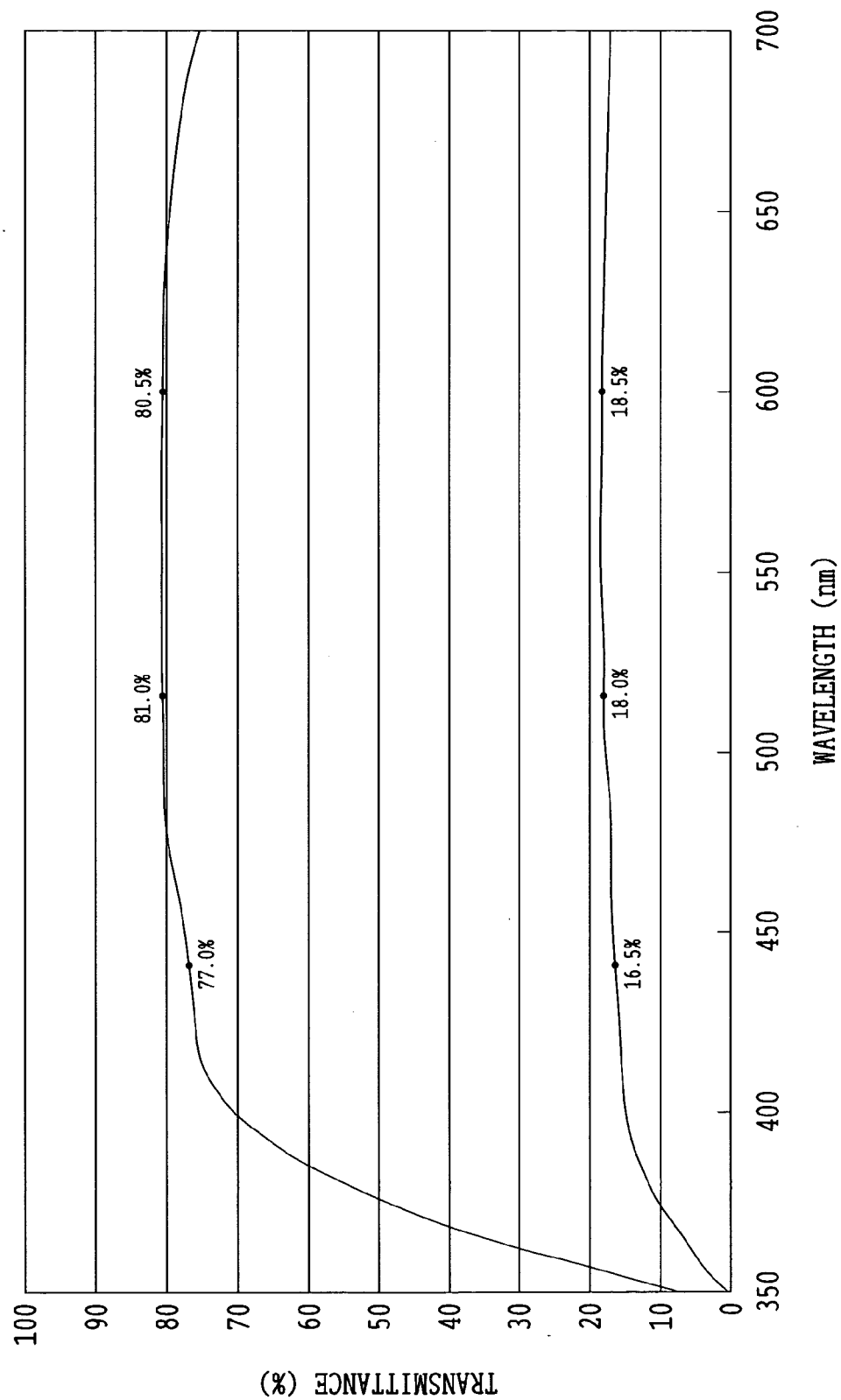
FIG. 1 is a graph showing the spectrum of transmittance characteristic of an electrochromic element which can apply as a variable transmittance means in the electronic imaging apparatus of the present invention.

Before undertaking the description of the embodiments, the function and advantages of the present invention will be explained.

Rayleigh's resolution limit in an ideal imaging optical system is shown as follows:

$$R(\text{line/mm}) = 1/1.22 F\lambda \text{ (where } \lambda \text{ represents a wavelength)}$$

In this case, contrast is several percents in the spatial frequency R(line/mm).

However, in actual optical system, since there is geometric aberration, a resolution limit becomes about half of it. The distortion by return is practically satisfactory even if the contrast in the Nyquist frequency of $10^3/2a$ (lines/mm) is a little less than 20%.

Therefore, in actual optical system, in place of coefficient 1.22, the value which is about 2.8 can be used in the Rayleigh's resolution limit formula.

Then, by putting $R=10^3/2a$, $\lambda=5\times10^{-4}$ into the formula, the following equation is obtained:

$$F = 1.4 \cdot a \quad (0 < a \leq 4) \tag{1}$$

In case of actual optical system, an optical low-pass filter is not necessary if the value of 1.4a(0<a<4) in this equation is set to be smaller than the open F value.

It is desirable that the following equation (1') is satisfied.

If so, the distortion by return is almost negligible in the optical system having an ordinary imaging function.

$$F > 1.7 \cdot a \quad (0 < a \leq 4) \tag{1'}$$

If the following equation (1") is satisfied, it is more desirable, the distortion by return is almost negligible even in the optical system having higher imaging function near to an ideal optical system.

$$F > 2 \cdot a \quad (0 < a \leq 4) \tag{1''}$$

By the way, a pitch of a picture element being small means that the effective number of picture element which substantially contributes to imaging is big. Accordingly the amount of data of the image, which is obtained by using such imaging device and recorded on a recording medium becomes inevitably huge.

On the other hand, since an imaging optical system does not have the resolution for the Nyquist frequency, the substantial number of the picture element which is recorded on a recording medium (number of recording picture element) can be smaller than the effective number of the picture element of the imaging device as long as it has the number of recording picture element corresponding to the resolution of the optical system.

That is, it is good that there is the relation satisfying the following condition (2) with respect to n and m, where n is the effective number of the picture element which substantially contributes to imaging in the imaging device and m is the substantial number of the picture element which is recorded on the recording medium in the electronic imaging apparatus.

$$1.0 \times 10^6 < m < 0.8n \qquad (2')$$

If the condition (2) is satisfied, practically useful resolution can be obtained without using a recording medium vainly.

Moreover, it is still better that there is the relation satisfying the following condition (2'):

$$1.2 \times 10^6 < m < 0.7n \qquad (2')$$

It is much more desirable that the further following condition (2") is satisfied:

$$1.7 \times 10^6 < m < 0.6\,n \qquad (2'')$$

Next, explanations will be made concerning the condition of the imaging characteristic as an imaging lens where the distortion by return is not conspicuous at a practical use level even if an optical low-pass filter is excluded.

In order to do away the contrast in the Nyquist frequency when F value of an imaging optical system is the open F value, the diameter of point image at the open F value of an imaging optical system can be bigger than pitch of a picture element.

Specifically, it is desirable that the size of the point image is approximately for 2 picture elements at a horizontal level, (4 picture elements in total, at a horizontal and a vertical level).

That is, it is desirable that with respect to the point image by the above-mentioned imaging optical system, the following condition is satisfied:

$$(Ein/Etot)\max < 0.25$$

where Ein is incident energy of the point image to the area corresponding to the size of one picture element, Etot is total energy of the point image and (Ein/Etot)max is the maximum value of ratio (Ein/Etot).

However, even if the contrast is a little less than 20% as mentioned above, the distortion by return is not problem practically in an actual optical system. Therefore, it is desirable that with respect to the point image by the said imaging optical system and the maximum ratio (Ein/Etot) max, the following condition is satisfied:

$$(Ein/Etot)\max < 0.5 \qquad (3)$$

where Ein is incident energy to the area corresponding to the size of one picture element and Etot is total energy of the point image.

It is more desirable that the following condition (3') is satisfied:

$$(Ein/Etot)\max < 0.4 \qquad (3')$$

It is much more desirable that the following condition (3") is satisfied:

$$(Ein/Etot)\max < 0.3 \qquad (3'')$$

If the pitch of a picture element of an imaging device becomes small, the restriction of the incidence angle to the imaging plane of the light contributing to imaging will become severe. That is, the permissible quantity of the gap to the optimal incidence angle becomes small.

In the present invention, therefore, it is necessary to set the difference between the maximum value and the minimum value of the ratio of ymax/Pex to be 0.2 or less than 0.2 over the whole range of zooming and focussing, where ymax (the maximum image height) is the distance from the intersection of the optical axis of the imaging optical system and the imaging plane of the electronic imaging device to the furthest point in the effective imaging area of the electronic imaging device, and Pex is the distance from the imaging plane of the electronic imaging device to an exit pupil position (the value is negative when it is measured toward object side). It is not desirable that the ratio exceeds 0.2, since it easily causes generation of shading.

It is more desirable that the difference between the maximum value and the minimum value of the ymax/Pex throughout the whole range of zooming and focusing is 0.15 or less. Moreover, it is much more desirable that the difference between the maximum and the minimum value of the ymax/Pex is 0.1 or less throughout the whole range of zooming and focusing.

Fining of the pitch of a picture element of an imaging device which was very difficult technology is progressing rapidly and the cost for fining is also being reduced in recent years. Therefore, it is predicted enough in the near future that an imaging device having fine pitch of a picture element satisfying the condition (1) is can be easily supplied and used at a low price. It is desirable that in accordance with fining of the pitch of a picture element, a photographing optical system also has higher resolution as much as possible within the range where the distortion by return in the photographing optical system also is practically permitted. In case of using an imaging apparatus having the Nyquist frequency that is strongly influenced by the diffraction in an imaging optical system, it is desirable that an imaging optical system uses an aperture stop where the value of the aperture stop is as much as possible within the range from the open F value to −2EV of it. (i.e. the area of the aperture stop is from fully opened one to about ¼ opened one)

The control of light quantity in this case is carried out by control of shutter speed or by control of light transmittance. In case that the control of light quantity is carried out by control of the shutter speed, it is difficult to carry out the control of the light quantity only by the mechanical shutter, taking into consideration of the shutter speed of a mechanical shutter. For this reason, the shutter function that an imaging device has will be used together.

By the way, if the pitch of a picture element becomes small, the interlace system (line interlace scanning system) must be used as a read-out system of picture information. In this system, scanning is carried out by jumping every two fields forming a picture frame (i.e. every odd number field and every even number field). In this scanning of the odd number field, and the scanning of the even number field, time difference (for example, 1/60 seconds) arises. For this reason, a method for read-out has been taken, where two fields of an odd number and even number are exposed simultaneously by using the mechanical shutter having rapid shutter speed of around 1ms and the read-out is carried out at a different timing.

In case that an exposure time is too short to be able to respond even if a mechanical shutter is used together with, the number of a picture element is thinned out and a read-out system equivalent to the progressive method (a sequential scanning system) is used by switching. It is desirable that in an imaging device as a method of read-out by the interlace system, a method using a signal of either one field of an odd number or an even number is adopted, otherwise, a measures as read out, by mixing the field of the n-th line and the field of the n+1th line (n is either an even number or an odd number) of a predetermined row is used, among other similar methods.

If such method is adopted, although vertical resolution will be lowered, the reading out separately two each field of odd number and even number is not necessary. That is, it is not necessary to determine an exposure time by using a mechanical shutter (in this case, the mechanical shutter plays the role of prevention of such as a smear and a useless leaked light). By adopting a shutter function using the characteristic that the potential of an imaging device can be controlled at very high speed (hereafter called an element shutter), a shutter speed rapider than 1/10000 second is available.

In this invention, it is desirable that a mechanical shutter and an element shutter are arranged together so that they can be selected corresponding to shutter speed. When control of light quantity is carried out by regulation of light quantity transmittance, two or more filters of which transmittance differs are held in an imaging apparatus, and a single or a combined set of the filters is inserted mechanically into an optical path.

Otherwise, the optical element of which transmittance can be changed by generating a chemical change according to the amount of electricity (hereafter it is called a variable transmittance element) is used. For example, an optical element, such as an electrochromic element having the spectrum transmittance characteristic shown by a graph in FIG. 1 or the like is arranged in an optical path. And the control of the quantity of electricity of the optical element is carried out under predetermined electric voltage, and thereby the stabilized transmittance with quick response is obtained and the control of light quantity is carried out.

In this case, in order to enlarge the control range of light quantity as much as possible, it is necessary that the ratio of τmax (τmax≧0.7) and τmin (τmin≦0.3) at the wavelength of 520 nm, of the said variable transmittance element is at least 2.5 or more, where τmax is the maximum transmittance and min is the minimum transmittance of the variable transmittance element.

It is desirable that the ratio of the maximum transmittance τmax and the minimum transmittance τmin at the wavelength of 520 nm, is set to 3.5.

When control of light quantity is carried out by regulation of light quantity transmittance as mentioned above, the spectrum transmittance in the variable transmittance element poses a problem.

It is desirable that the transmittance τ520 at the wavelength of 520 nm satisfies the following condition (4) or (5) with respect to the spectrum over whole range that is τmin≦τ520≦τmax:

$$\tau 440/\tau 520 > 0.7 \quad (4)$$

$$\tau 600/\tau 520 > 0.8 \quad (5)$$

where τX (X is a numeral) is transmittance at wavelength of X nm.

It is more desirable that the following condition (4'), (5') is satisfied:

$$\tau 440/\tau 520 > 0.75 \quad (4')$$

$$\tau 600/\tau 520 > 0.85 \quad (5')$$

It is much more desirable that the following condition (4"), (5") is satisfied:

$$\tau 440/\tau 520 > 0.8 \quad (4'')$$

$$\tau 600/\tau 520 > 0.9 \quad (5'')$$

In an electronic imaging apparatus aiming at designing a small size or a slim size style, if the said variable transmittance element is used, the size or volume of the apparatus will increase for the element.

The said variable transmittance element has, in many cases, composition where a substance performing an oxidation-reduction reaction by giving or removing the amount of electricity is sandwiched with transparent bodies in form of plate like body having transparent electrode from both sides.

Then, the increase of a size or volume of the apparatus can be avoided by taking such measures that the optical element constituting the imaging optical system including a lens and a prism or filter and the like is substituted for the said plate like transparent body, and transparent electrodes are prepared on optical elements facing each other, and the substance performing oxidation-reduction reaction is sandwiched with such elements.

Hereafter an embodiment of the present invention will be explained by using drawings.

Figure 2:
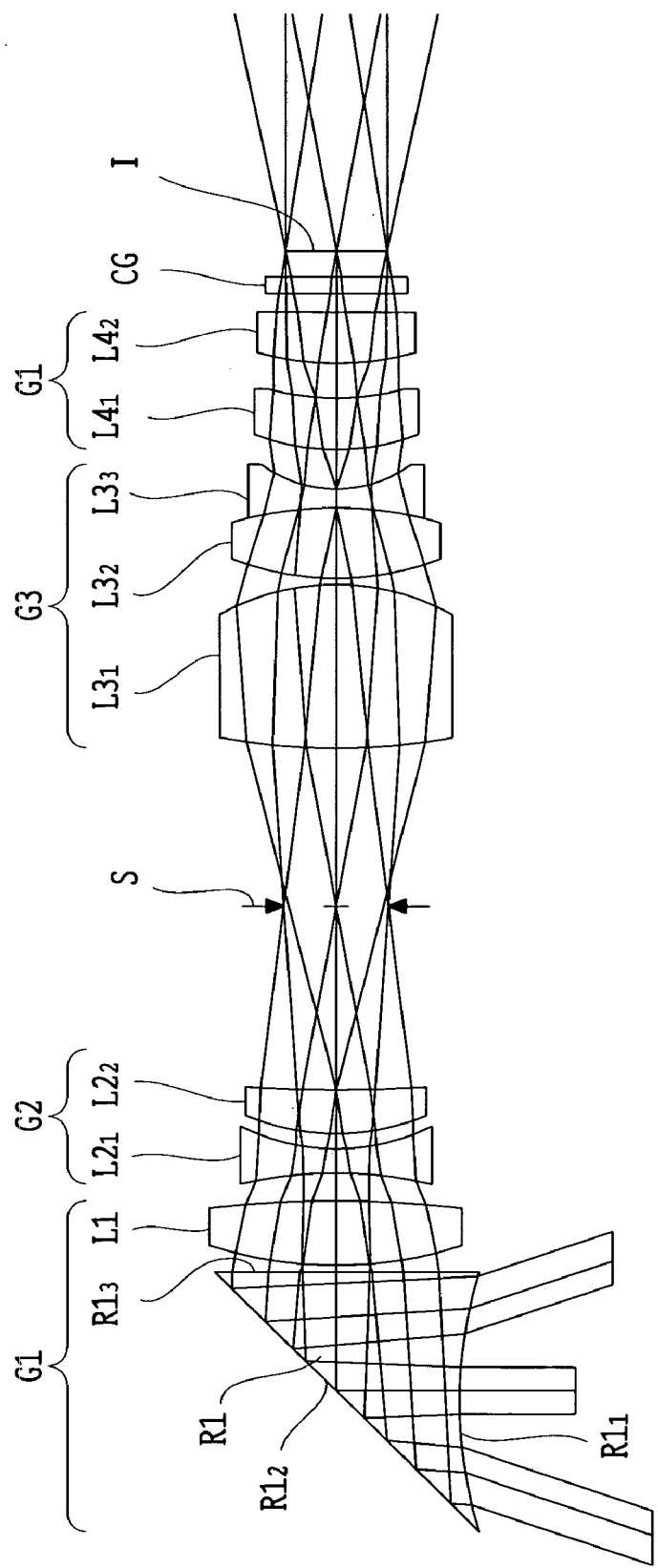
FIG. 2 is a sectional view showing an optical arrangement, developed along the optical axis, at the wide angle position where the optical path is bent in focusing of the infinite object point, in the first embodiment of the zoom lens used in the electronic imaging apparatus according to the present invention.

First Embodiment:

FIG. 2 is a sectional view showing an optical arrangement, developed along the optical axis, at the wide angle position where the optical path is bent in focusing of the infinite object point, in the first embodiment of the zoom lens used in the electronic imaging apparatus according to the present invention.

Figure 3A:
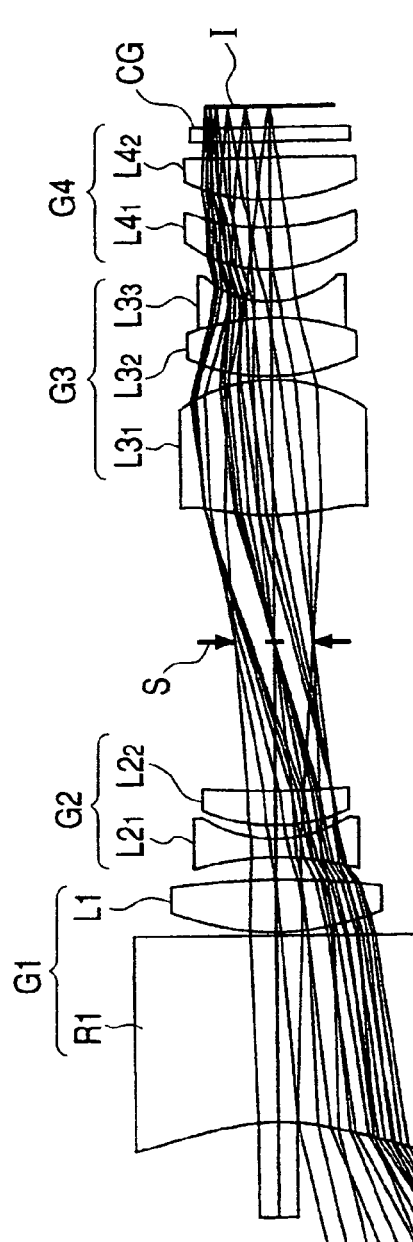
FIGS. 3A, 3B and 3C are sectional views showing an optical arrangement, developed along the optical axis, at the wide-angle, middle and telephoto positions, respectively, in focusing of the infinite object point, of the zoom lens in the first embodiment.
Figure 3B:
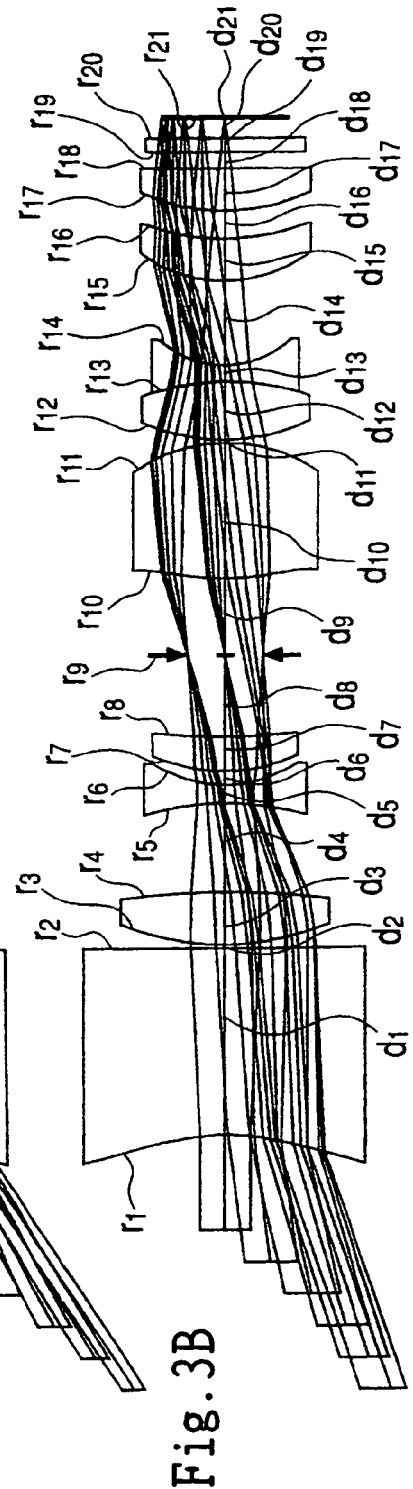
Figure 3C:
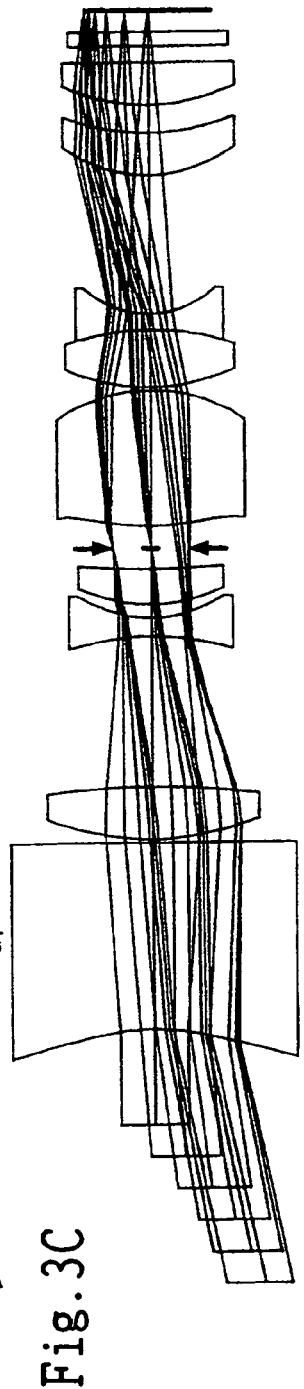

FIGS. 3A, 3B and 3C are sectional views showing an optical arrangement, developed along the optical axis, at the wide-angle, middle and telephoto positions, respectively, in focusing of the infinite object point, of the zoom lens used in the electronic imaging apparatus according to the present invention.

The electronic imaging apparatus of the first embodiment comprises, in order from the object side, a zoom lens and a CCD which is an imaging device. In FIG. 2, reference symbol I represents the imaging plane of the CCD. A cover glass CG for the CCD is interposed between the zoom lens and the imaging plane I.

The zoom lens comprises, in order from the object side, a first lens unit G1, a second lens unit G2, an aperture stop S, a third lens unit G3 and a fourth lens unit G4.

The first lens unit G1 includes, in order from the object side, a reflective optical component R1 for bending the optical path and a biconvex lens L1, having positive refracting power as a whole.

The reflective optical component R1 is constituted as a prism having an incidence surface $R1_1$, a reflective surface $R1_2$ for bending the optical path, and an exit surface $R1_3$.

The aspect ratio of an effective imaging area is 3:4 and the optical path is laterally bent.

The second lens unit G2 includes, in order from the object side, a biconcave lens $L2_1$ and a positive meniscus lens $L2_2$ with a convex surface directed toward the object side, having negative refracting power as a whole.

The third lens unit G3 includes a biconvex lens $L3_1$ and a cemented lens consisting of a biconvex lens $L3_2$ and a biconcave lens $L3_3$ having positive refracting power as a whole.

The fourth lens unit G4 includes a positive meniscus lens $L4_1$ with a convex surface directed toward the object side, and a positive lens $L4_2$ having a convex surface directed toward the object side and a flat surface directed toward the image side.

When the magnification of the lens is changed, in focusing of infinite object point, from the wide-angle end to the telephoto end, the first lens unit G1 remains fixed, the second lens unit G2 is moved toward the image side, the aperture stop remains fixed, the third lens unit G3 is moved toward the object side, and the fourth lens unit remains fixed. In focusing operation, the fourth lens unit G4 is moved along the optical axis.

Aspherical surfaces are provided to the incidence surface $R1_1$ of the reflecting optical element R1 in the first lens unit G1, the object-side surface of the biconvex lens L1 in the first lens unit G1, both surfaces of the biconcave lens $L2_1$ in the second lens unit G2, both surfaces of the biconvex lens $L3_1$ in the second lens unit G3, and the object-side surface of the positive lens $L4_2$ having a convex surface directed toward the object and a flat surface directed toward the image side in the fourth lens unit G4.

Lens data of optical members constituting the optical system of the first embodiment are listed below.

In the numerical data, $r_1$, $r_2$,—denote radii of curvature of individual lens surfaces; $d_1$, $d_2$,—denote thickness of individual lenses or air space between them; $n_{d1}$, $n_{d2}$,—denote refractive indices of individual lenses at the d line; $\nu_{d1}$, $\nu_{d2}$, denotes Abbe's numbers of individual lenses; Fno. denotes an F number; f denotes a total focal length, and D0 denotes distance from an object to the first surface of a lens element.

Also, when z is taken as the coordinate in the direction of the optical axis, y is taken as the coordinate normal to the optical axis, K represents a conic constant, and $A_4, A_6, A_8$, and $A_{10}$ represent aspherical coefficients, the configuration of each of the aspherical surface is expressed by the following equation:

$$z = (y^2/r)/[1 + \{1 - (1+K)(y/r)^2\}^{1/2}] + A_4 y^4 + A_6 y^6 + A_8 y^8 + A_{10} y^{10}$$

These symbols hold for the numerical data of the embodiments to be described later.

Numerical data 1

| | | | |
|---|---|---|---|
| $r_1 = -6.8055$ (aspherical surface) | $d_1 = 5.9040$ | $n_{d1} = 1.80518$ | $\nu_{d1} = 25.42$ |
| $r_2 = \infty$ | $d_2 = 0.1080$ | | |
| $r_3 = 6.9176$ (aspherical surface) | $d_3 = 1.6560$ | $n_{d3} = 1.78800$ | $\nu_{d3} = 47.37$ |
| $r_4 = -26.3233$ | $d_4 = D4$ | | |
| $r_5 = -8.8537$ (aspherical surface) | $d_5 = 0.5760$ | $n_{d5} = 1.74320$ | $\nu_{d5} = 49.34$ |
| $r_6 = 3.6470$ (aspherical surface) | $d_6 = 0.4320$ | | |
| $r_7 = 5.2606$ | $d_7 = 1.0800$ | $n_{d7} = 1.84666$ | $\nu_{d7} = 23.78$ |
| $r_8 = 21.8136$ | $d_8 = D8$ | | |
| $r_9 = \infty$ (aperture stop) | $d_9 = D9$ | | |
| $r_{10} = 7.4954$ (aspherical surface) | $d_{10} = 4.2382$ | $n_{d10} = 1.69350$ | $\nu_{d10} = 53.21$ |
| $r_{11} = -4.9961$ (aspherical surface) | $d_{11} = 0.1080$ | | |
| $r_{12} = 6.0853$ | $d_{12} = 1.7991$ | $n_{d12} = 1.51742$ | $\nu_{d12} = 52.43$ |
| $r_{13} = -7.7353$ | $d_{13} = 0.5040$ | $n_{d13} = 1.84666$ | $\nu_{d13} = 23.78$ |
| $r_{14} = 2.9880$ | $d_{14} = D14$ | | |
| $r_{15} = 4.3888$ | $d_{15} = 1.2960$ | $n_{d15} = 1.48749$ | $\nu_{d15} = 70.23$ |
| $r_{16} = 6.9896$ | $d_{16} = D16$ | | |
| $r_{17} = 6.3039$ (aspherical surface) | $d_{17} = 1.2960$ | $n_{d17} = 1.58423$ | $\nu_{d17} = 30.49$ |
| $r_{18} = \infty$ | $d_{18} = 0.5040$ | | |
| $r_{19} = \infty$ | $d_{19} = 0.4320$ | $n_{d19} = 1.51633$ | $\nu_{d19} = 64.14$ |
| $r_{20} = \infty$ | $d_{20} = D20$ | | |
| $r_{21} = \infty$ (image plane) | $d_{21} = 0$ | | |

Aspherical coefficient

First surface $K = 0$
$A_4 = 2.5676 \times 10^{-3}$  $A_6 = -6.2005 \times 10^{-5}$  $A_8 = 1.1890 \times 10^{-6}$
$A_{10} = 0$ Third surface $K = 0$
$A_4 = -1.3981 \times 10^{-3}$  $A_6 = 7.4261 \times 10^{-6}$  $A_8 = 1.3153 \times 10^{-7}$
$A_{10} = 0$ Fifth surface $K = 0$
$A_4 = -2.2808 \times 10^{-3}$  $A_6 = 6.6740 \times 10^{-4}$  $A_8 = -5.4806 \times 10^{-5}$
$A_{10} = 0$ Sixth surface $K = 0$
$A_4 = -5.0400 \times 10^{-3}$  $A_6 = 9.290.7 \times 10^{-4}$  $A_8 = -1.1383 \times 10^{-4}$
$A_{10} = 0$ Tenth surface $K = 0$
$A_4 = -2.4253 \times 10^{-3}$  $A_6 = -7.7000 \times 10^{-5}$  $A_8 = -2.7271 \times 10^{-5}$
$A_{10} = 0$ Eleventh surface $K = 0$
$A_4 = 5.4258 \times 10^{-4}$  $A_6 = -8.1053 \times 10^{-5}$  $A_8 = -2.5810 \times 10^{-6}$
$A_{10} = 0$ Seventeenth surface $K = 0$
$A_4 = 3.5183 \times 10^{-4}$  $A_6 = 1.1576 \times 10^{-4}$  $A_8 = -2.5892 \times 10^{-5}$
$A_{10} = 0$ Zoom data D0 (distance from an object to the first surface of a lens element) is infinite.

| | (wide-angle) | (middle) | (telephoto) |
|---|---|---|---|
| f (mm) | 3.31484 | 5.61627 | 9.50358 |
| Fno. | 2.8634 | 3.5902 | 4.5306 |
| D0 | $\infty$ | $\infty$ | $\infty$ |
| D4 | 0.71912 | 2.82135 | 4.73242 |
| D8 | 4.66118 | 2.55350 | 0.64782 |
| D9 | 3.98987 | 2.38785 | 0.71910 |
| D14 | 0.99172 | 2.60884 | 4.26108 |
| D16 | 0.86249 | 0.86226 | 0.86394 |
| D20 | 0.64778 | 0.63255 | 0.64769 |

Numerical data concerning parameters in equations, etc.
Pitch of a picture element: $a = 1.2$ μm
Number of the effective picture element: $n = 2400 \times 1800$
Number of the recorded picture element: $m = 1600 \times 1200$
(Ein/Etot)max=0.28
Image height: H=1.8
ymax/Pex=−0.029327 (at wide-angle end)
ymax/Pex=−0.005993 (at telephoto end)
Difference of the above two ymax/Pex: 0.023334
Maximum transmittance: $\tau$max=0.81 (at $\lambda$=520 nm)

Minimum transmittance: $\tau min=0.18$ (at $\lambda=520$ nm)

$\tau max/\tau min=4.5$ $\tau 440/\tau 520=0.951$ where transmittance $\tau 520$ (at $\lambda=520$ nm) is the maximum transmittance $\tau max$.

$\tau 440/\tau 520=0.917$ where transmittance $\tau 520$ (at $\lambda=520$ nm) is the minimum transmittance $\tau min$.

$\tau 600/\tau 520=0.994$ where transmittance $\tau 520$ (at $\lambda=520$ nm) is the maximum transmittance $\tau max$.

$\tau 600/\tau 520=1.028$ where transmittance $\tau 520$ (at $\lambda=520$ nm) is the minimum transmittance min.

The electronic imaging apparatus of the present invention mentioned above can be used especially for photography equipment in which a photograph is taken in such manner that an object image is formed by an imaging optical system such as a zoom lens and the like, and then the object image is input to an imaging device such as CCD or halide film, in particular, to a digital camera, a video camera, a personal computer as an example of information processing equipment, a telephone, especially a cellular phone convenient to carry, etc. Embodiments for them will be illustrated below.

Figure 4:
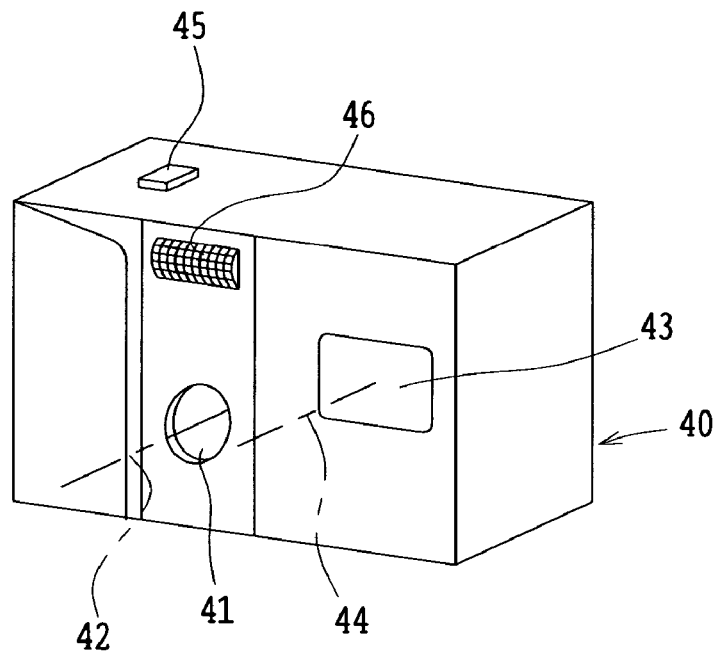
FIG. 4 is a front perspective view showing the exterior of a digital camera embodied by an electronic imaging apparatus according to the present invention.
Figure 5:
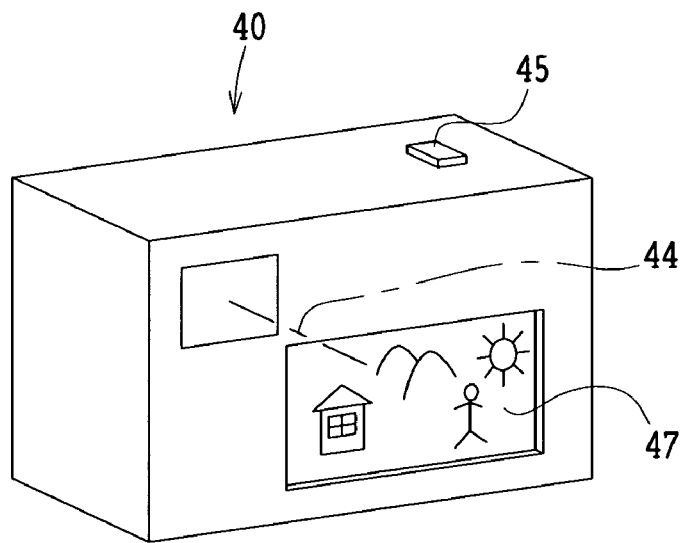
FIG. 5 is a rear perspective view showing the exterior of the digital camera shown in FIG. 4.
Figure 6:
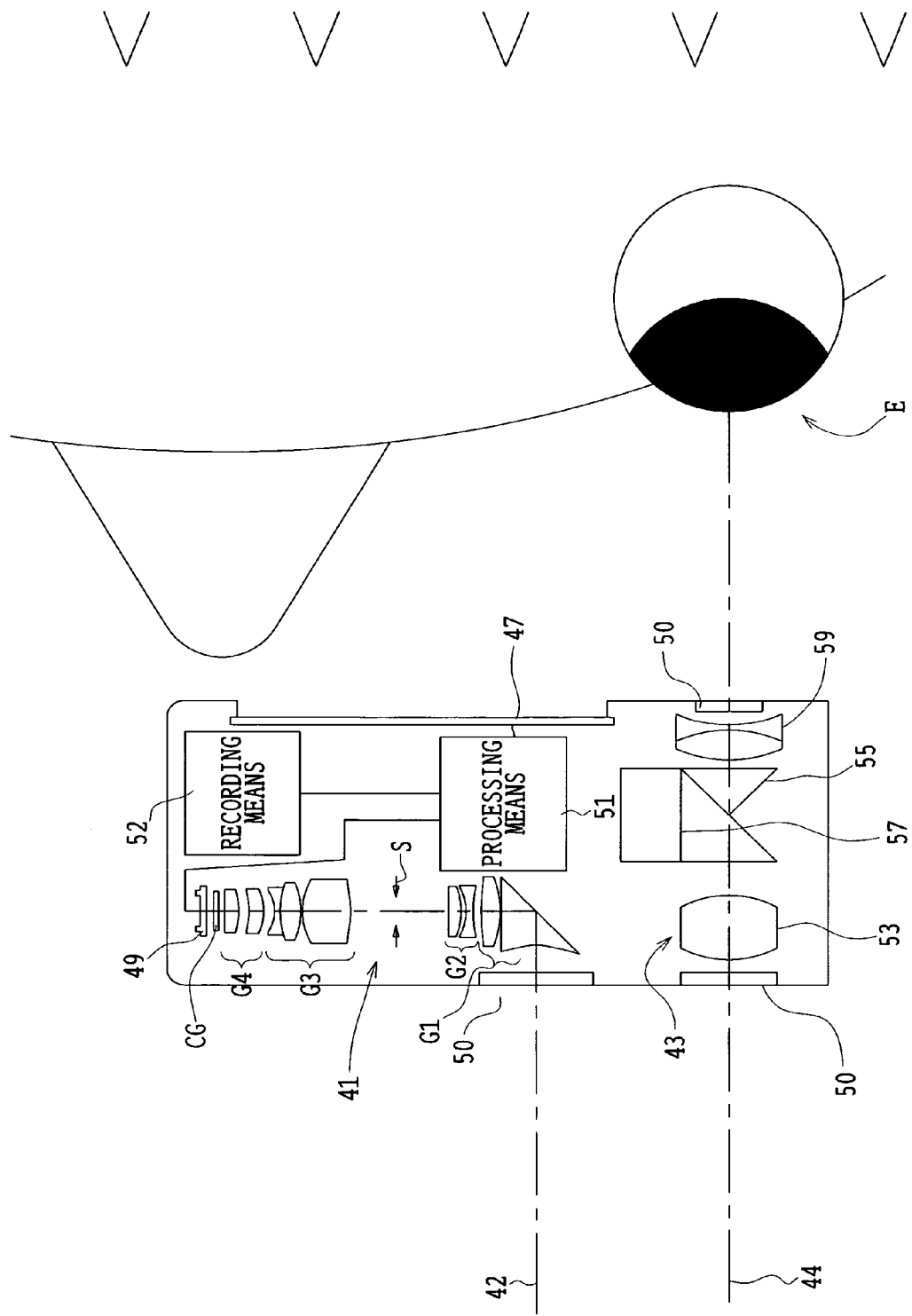
FIG. 6 is a sectional view showing the construction of the digital camera shown in FIG. 4.

FIGS. 4, 5 and 6 are conceptual views showing a digital camera 40 embodied by an electronic imaging apparatus according to the present invention. FIG. 4 is a front perspective view showing the exterior of the digital camera 40. FIG. 5 is a rear perspective view showing the exterior of the digital camera 40.

FIG. 6 is a sectional view showing the construction of the digital camera 40. The digital camera in FIG. 6 has structure where the light path is bent to the direction of longer side of a finder, and viewing from upward shows an observer's eye in FIG. 6.

In this embodiment, the digital camera 40 includes a photographing optical system 41 having an optical path 42 for photography, a finder optical system 43 having an optical path 44 for the finder, a shutter 45, a flash 46, and liquid crystal display monitor 47, etc. The camera 40 is constructed so that photographing is carried out through the photographing optical system 41, for example, the zoom lens system having the bent optical path in the first embodiment when the shutter 45 arranged on the camera 40 is pushed.

And the object image formed by the photographing optical system 41 is formed on the imaging plane of CCD 49 through the near infrared cutoff filter, or the near infrared cutoff coat given to the CCD cover glass or other lenses.

The object image input by this CCD 49 is displayed on a liquid crystal display monitor 47 arranged behind the camera as an electronic image through a processing means 51. A record means 52 is connected with the processing means 51 where the photographed electronic image can be also recorded.

This record means 52 may be arranged separately from the processing means 51 or may be constituted to carry out writing and recording electronically by using a floppy disk, memory card, MO, etc. This may be constituted as a halide camera in which halide film is arranged instead of the CCD 49.

Furthermore, the object optical system 53 for the finder is arranged on the light path 44 for the finder. The object image formed of this object optical system 53 for the finder is formed on a view frame 57 of a Porro prism 55 which is a member for getting a positive erect image. Behind this Porro prism 55, an ocular optical system 59 which leads a positive erect image to the observer's eyeball E is arranged.

In addition, cover members 50 are arranged at the incident side of the photographing optical system 41 and the object optical system 53 for the finder, and at the exit side of the ocular optical system 59, respectively. Thus, the digital camera 40 constituted above mentioned is advantageous in making a slim sized camera since the light path is arranged and bent in the direction of the longer side. Moreover, since the photographing optical system 41 has a high variable ratio of magnification and wide-angle view, and the zoom lens is bright and has good aberration and big back focus, high performance and low cost can be achieved.

The photographing path of the digital camera 40 in this embodiment can be constituted to be bent to the direction of the shorter side of the finder.

In this case, a layout for easing an influence of the shadow generated when a speed light is used in photographing a person can be obtained by arranging a stroboscope (or flash) spaced more upward from the incidence surface of a photographing lens. In an example of FIG. 6, a parallel plane plate is arranged as a cover member 50,but a power lens may be used instead of the plate.

Figure 7:
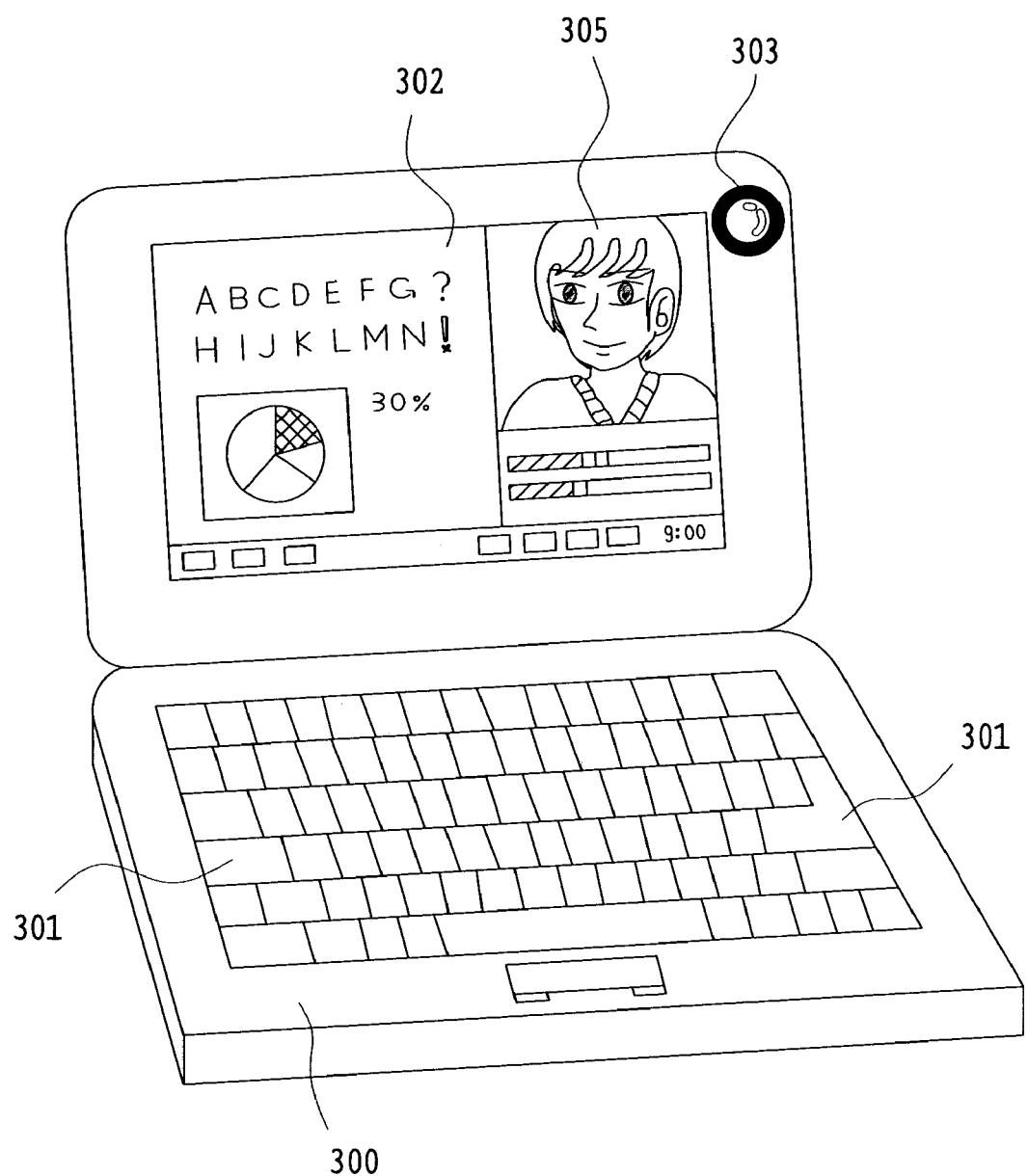
FIG. 7 is a front perspective view showing a personal computer, as an example of an information processing device, where its cover is opened and the zoom lens is built in as an object optical system where the optical path is bent.
Figure 8:
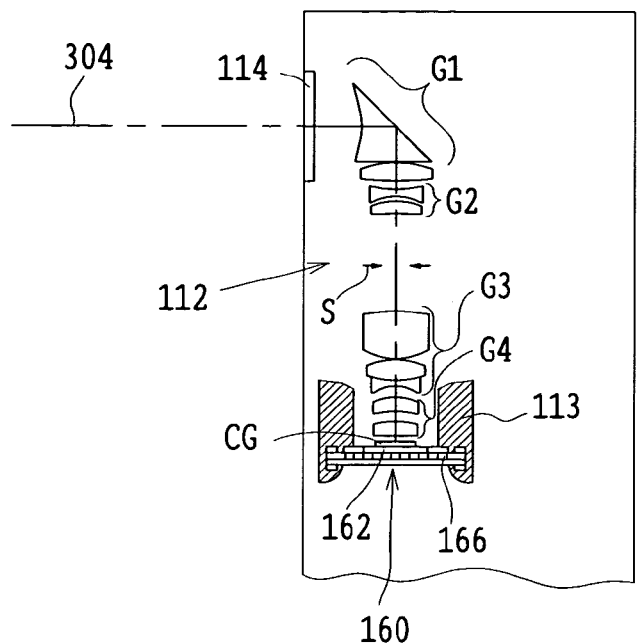
FIG. 8 is a sectional view showing a photographing optical system of the personal computer.
Figure 9:
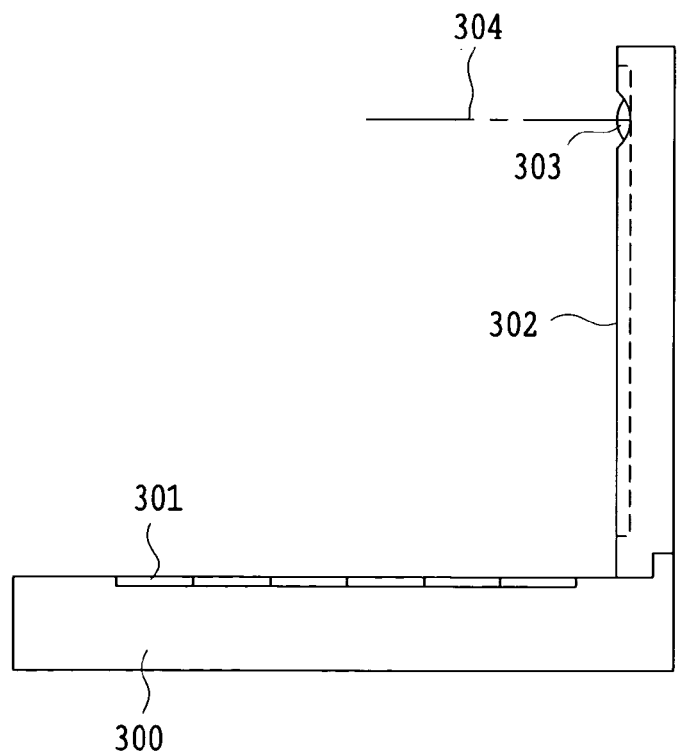
FIG. 9 is a side view of FIG. 7.

Next, a personal computer, as an example of an information processing equipment in which a bent zoom lens of the electronic imaging apparatus according to the present invention is built as an object optical system is shown in FIGS. 7~9.

FIG. 7 is a front perspective view of a personal computer 300 of which cover is opened. FIG. 8 is a sectional view of a photographing optical system 303 of the personal computer 300 and FIG. 9 is a side view of FIG. 7.

As shown in the FIGS. 7~9, the personal computer 300 has a keyboard 301 for an operator inputting information from exterior, an information processing means and a recording means (illustrations are omitted), a monitor 302 for displaying information to the operator, and a photographing optical system 303 for photographing the image of the operator himself or herself and circumference.

A monitor 302 can be a penetrated type liquid crystal display element illuminated from backward by a back light which is not illustrated, a reflected type liquid crystal display element which reflects and displays the light from the front side, a CRT display, etc. In this FIG., although a photographing optical system 303 is built in a monitor 302 at the upper right portion, it can be arranged anywhere not only around the monitor 302 but also around the keyboard 301.

This photographing optical system 303 has, for example, an object lens 112 including a light path bending zoom lens in the first embodiment according to the present invention, and an imaging device chip 162 which receives an image light on a photographing path 304. These are built in the personal computer 300.

Here, a cover glass CG is additionally stuck on the imaging device chip 162 and is formed in integrated one as the imaging unit 160,and it can be attached and connected by one-touch action by inserting in the back end of the mirror frame 113 of the object lens 112. Accordingly, positioning of the center as well as adjustment of the distance of the surface of the object lens 112 and the imaging device chip 162 is unnecessary and assembling of them is also easy. Illustration of a drive mechanism, etc. for the zoom lens in the mirror frame 113 is omitted.

An object image received with the imaging device chip 162 is input into the processing means of the personal computer 300, and is displayed on the monitor 302 as an electronic picture. In FIG. 7 as an example, a picture 305 in which the operator was photographed is shown. This picture 305 can also be displayed through a processing means on a communication partner's personal computer from a remote place through the Internet or a telephone.

Next, a telephone which is an example of the information processing equipment in which the bent zoom lens of this invention is built in as a photographing optical system, a cellular phone especially convenient to carry is shown in FIGS. 10A~10C. FIG. 10A is a front view of a cellular phone 400. FIG. 10B is a side view and FIG. 10C is a sectional view of a photographing optical system 405.

As shown in FIGS. 10A~10C, the cellular phone 400 has a microphone part 401 which inputs an operator's voice as information, a speaker part 402 which outputs a telephone call partner's voice, an input dial 403 by which an operator inputs information, a monitor 404 which displays information such as photography images of the operator himself or herself, of the telephone call partner and of a telephone number, a photographing optical system 405, an antenna 406 which performs transmitting and receiving of a communication electric wave, and a processing means (illustration not shown) to process picture information, communication information, input signal, etc.

Here, a monitor 404 is a liquid crystal display element. Arrangement and position of each composition is not restricted to these shown in FIG. This photographing optical system 405 has an object lens 112 which is arranged on a photographing path 40.7 and consists of an optical path bending zoom lens of the first embodiment, for example, according to the present invention, and the imaging device chip 162 which receives the light of an object image. These are built in the cellular phone 400.

Here, a cover glass CG is additionally stuck on an imaging device chip 162 and is formed in integrated one as an imaging unit 160, and it can be attached and connected by one-touch action by inserting in the back end of the mirror frame 113 of an object lens 112. Accordingly, positioning of the center as well as adjustment of the distance of the surface of the object lens 112 and the imaging device chip 162 is unnecessary and assembling of them is also easy. Illustration of drive mechanism for the zoom lens, etc. in the mirror frame 113 is omitted.

An object image received with the imaging device chip 162 is input into the processing means (not shown), and is displayed on a monitor 404 as an electronic picture or on a monitor of a communication partner or on the both of monitors. The processing means has a signal processing function to convert the information of an object image received by the imaging device chip 162 into the signal which can be transmitted when transmitting a picture to a communication partner.

What is claimed is:

1. An electronic imaging apparatus comprising:
   an imaging optical system, and
   an electronic imaging device which converts an object image obtained via the imaging optical system to an electric signal; wherein all medium of optical elements which is disposed in a space between a lens element at most image side of the imaging optical system and the electronic imaging device and on the optical path is constituted of optically isotropic medium, and
   wherein a diameter of a point image at the open F value of the imaging optical system is constituted to be bigger than a pitch of a picture element and the following condition is satisfied:

$F > 1.4 \cdot a (0 < a \leq 4)$ where F represents the open F value of the imaging optical system, and a represents the pitch of the picture element at a horizontal or a vertical direction of the imaging device.

2. An electronic imaging apparatus according to claim 1, wherein the F value of the imaging optical system remains fixed at the open F value.

3. An electronic imaging apparatus according to claim 1, wherein the following condition is satisfied:

$1.0 \times 10^6 < m < 0.8n$ where n is the effective number of a picture element which contributes substantially to imaging in the electronic imaging device and m is substantial number of a picture element which is recorded on a recording medium in the electronic imaging apparatus (the number of recorded picture element).

4. An electronic imaging apparatus according to claim 1, wherein the following condition is satisfied:

$(Ein/Etot)max < 0.5$ where Ein is incident energy of the point image to area corresponding to the size of one picture element, and Etot is total energy of the point image, and (Ein/Etot)max is the maximum value of ratio (Ein/Etot).

5. An electronic imaging apparatus according to claim 1, wherein the difference of the maximum value and the minimum value of the ratio of ymax/Pex is 0.2 or less than 0.2 throughout the whole range of zooming and focussing, where ymax (the maximum image height) is the distance from the intersection of an optical axis of the imaging optical system and an image plane of the electronic imaging device to the furthest point in the effective imaging area of the electronic imaging device, and Pex is the distance from the imaging plane of the electronic imaging device to an exit pupil position (a negative value when it is measured toward an object side).

6. An electronic imaging apparatus according to claim 1, wherein at least one of the optical elements can change transmittance by controlling quantity or voltage of electricity.

7. An electronic imaging apparatus according to claim 6, wherein the ratio of the maximum transmittance τmax ($\geq 0.7$) and the minimum transmittance τmin ($\leq 0.3$) at the wavelength of 520 nm of the optical element which can change transmittance by controlling quantity or voltage of electricity is 2.5 or more.

8. An electronic imaging apparatus according to claim 7, wherein with respect to the transmittance τ520 at the wavelength of 520 nm, the spectrum transmittance at the whole range (τmin$\leq$τ520$\leq$τmax) satisfies the following condition:

$\tau 440/\tau 520 > 0.7$ $\tau 600/\tau 520 > 0.8$ where τX (X is a numeral) is the transmittance at the wavelength Xnm.

9. An electronic imaging apparatus according to claim 7, wherein with respect to the transmittance τ520 at the wavelength of 520 nm, the spectrum transmittance at the whole range (τmin$\leq$τ520$\leq$τmax) satisfies the following condition:

$\tau 440/\tau 520 > 0.75$ $\tau 600/\tau 520 > 0.85$ where τX (X is a numeral) is the transmittance at the wavelength Xnm.

10. An electronic imaging apparatus according to claim 7, wherein with respect to the transmittance τ520 at the wavelength of 520 nm, the spectrum transmittance at the whole range (τmin$\leq$τ520$\leq$τmax) satisfies the following condition:

$\tau 440/\tau 520 > 0.8$ $\tau 600/\tau 520 > 0.9$ where τX (X is a numeral) is the transmittance at the wavelength Xnm.

11. An electronic imaging apparatus according to claim 6, wherein the optical element which can change transmittance by controlling quantity or voltage of electricity is constituted in that electrochemistry substance is interposed between solid transparent members from both sides, and at least, one of the solid transparent members is constituted of lens.

* * * * *